(12) United States Patent
Naito et al.

(10) Patent No.: US 6,528,916 B1
(45) Date of Patent: Mar. 4, 2003

(54) BRUSHLESS MOTOR

(75) Inventors: Hayato Naito, Nagano (JP); Satoshi Tanimura, Nagano (JP); Izumi Komatsu, Nagano (JP)

(73) Assignee: Sankyo Seiki Mfg. Co., Ltd., Nagano-ken (JP)

( * ) Notice: Subject to any disclaimer, the term of this patent is extended or adjusted under 35 U.S.C. 154(b) by 0 days.

(21) Appl. No.: 09/640,291

(22) Filed: Aug. 16, 2000

(30) Foreign Application Priority Data

Aug. 19, 1999 (JP) .............................. 11-232476

(51) Int. Cl.⁷ .................. H02K 11/00; H02K 5/00; H02K 5/16
(52) U.S. Cl. ..................... 310/71; 310/91; 310/90
(58) Field of Search ..................... 310/71, DIG. 6, 310/91, 90, 68 R, 66

(56) References Cited

U.S. PATENT DOCUMENTS 4,580,090 A * 4/1986 Bailey et al. ............. 323/303

FOREIGN PATENT DOCUMENTS

| JP | 05191958 | * 7/1993 |
| JP | 09149602 | * 6/1997 |

* cited by examiner

Primary Examiner—Nestor Ramirez
Assistant Examiner—Guillermo Perez
(74) Attorney, Agent, or Firm—Reed Smith LLP

(57) ABSTRACT

A pulse width modulated brushless electric motor employs a conductive metal screw or similar connector to create a common potential between the stator core and the iron substrate on which the motor drive circuit is mounted. By approximately setting the common potential to, for example, the base line of the power source and motor drive circuit, the noise electromagnetically generated by the pulse width modulation is suppressed.

13 Claims, 7 Drawing Sheets

BRUSHLESS MOTOR

FIELD OF THE INVENTION

The present invention relates to a brushless motor which is used as a capstan motor for VCRs and the like. More specifically, the present invention relates to a brushless motor driven by a PWM (Pulse Width Modulation) method.

RELATED ART

As a capstan motor for VCR, a brushless motor comprising the following is adapted as shown in FIG. 1. Rotor 5 which rotates together with rotational shaft 10 is held by bearing 20. Stator 30 has stator core 32 with drive coil 31 wound therearound. A motor drive circuit 60 is formed on metal substrate 40 and which has a drive IC. Brushless motor 1 employs the direct PWM method in which electric flow to drive coil 31 is controlled by turning on or off a power transistor (a switching component) of motor drive circuit 60 and modulating the width of a switching pulse to the switching component.

According to the PWM method, the amount of electricity wasted as heat generated in a conventional motor drive circuit can be dramatically decreased. In addition, energy is efficiently saved while driving the motor. Further, few new parts are needed when the method is adapted. Therefore, the method provides high cost-performance.

FIGS. 2(A), (B), 3 and 4 describe the PWM method. FIG. 2(A) shows a motor drive circuit of a brushless motor employing the direct PWM method supplying electric power from a source to a motor drive coil. FIG. 2(B) shows the same when regenerative current is caused due to counter-electromotive force generated in the drive coil as the supply of the electric power from the source to the drive coil is suspended. FIG. 3 shows waveforms of voltage and current applied to the drive coil during one phase when the control operations as described in FIGS. 2(A) and (B) are performed. FIG. 4 shows waveforms of voltage and current for the following periods within period (a) in FIG. 3: period (b) in which voltage is applied to the drive coil; and period (c) in which application of voltage to the drive coil is suspended.

As shown in FIGS. 2(A) and 3, when power transistor Q4 and power transistor Q1 are on, voltage VM is applied from source 66 to drive coil 31 such that current flows in drive coil 31. This current flows to ground M-GND of motor source 66 via power transistor Q4 (during period b in FIG. 4). The motor current gradually increases, corresponding to the time constant of drive coil 31, as shown in FIG. 4.

On the other hand, as shown in FIGS. 2(B) and 3, when power transistor Q1 is turned off while power transistor Q4 is still on, application of voltage VM from motor source 66 to drive coil 31 is interrupted. However, counterelectromotive forces E1 and E2 are generated in each drive coil 31. Hence, regenerative current flows in drive coil 31 via diode 61 as motor current. The regenerative current gradually decreases corresponding to the time constant of drive coil 31, as shown in FIG. 4. Before the regenerative current reaches the minimum value, power transistor Q1 is turned on such that current is supplied from motor source 66.

As described above, a part of the motor current is supplied by the regenerative current in brushless motor 1. Therefore, the amount of current (electricity) supplied from the outside can be reduced. Also, the power transistors through which the motor current flows are constantly saturated; hence the amount of electricity consumed in motor drive circuit 60 can be minimized.

ISSUES TO BE SOLVED

However, in brushless motor 1 employing the direct PWM method, the voltage applied to drive coil 31 fluctuates between drive source voltage VM and ground potential M-GND in a short period of time. As a result, voltage applied to wiring between motor drive circuit 60 and coil 31 and voltage applied to coil 31 shows rapid fluctuations, causing electromagnetic noise which has various negative effects on the operation of apparatus having the motor. This electromagnetic noise is alleviated by motor parts, which form a capacitive coupling with drive coil 31 and the wiring, e.g. stator core 32, around which drive coil 31 is wound, or an iron plate sandwiching an insulating layer with a wiring on metal substrate 40 as a circuit substrate of the motor, to help the electromagnetic noise to diffuse.

Further, the current from motor source 66 is supplied during only period b in FIG. 4. It is suspended during period c which follows period b. Therefore, pulse current, which can be turned on or off with a PWM carrier frequency, flows through the wiring of motor source 66 on metal substrate 40. This pulse current generates the electromagnetic noise to which is propagated by the stator core 32 and metal substrate 40 The pulse current also causes undesirable results in the operation of the apparatus by generating ripples in motor source 66.

Considering the above issues, the present invention intends to provide a brushless motor employing the PWM method which has a configuration to suppress generation of electromagnetic noise.

To accomplish the above purpose, the present invention provides a brushless motor employing the direct PWM method which controls an electric flow to a drive coil by modulating the width of a switching pulse to a switching component wherein at least one of a metal plate forming a metal substrate and a stator core is short-circuited to a fixed electric potential. Also, an insulating resistance between a mounting portion of the motor to be connected to a chassis of a main body and the metal plate and an insulating resistance between the mounting portion and the stator core are established to be higher than 1K ohm.

According to the present invention, when a brushless motor is driven by the direct PWM method, both voltage applied to the wiring between a motor drive circuit and a drive coil and voltage applied to the drive coil itself show rapid fluctuations. The electric potentials of a metal plate as a base of a metal substrate and a stator core, which form capacitive coupling with the above parts are fixed. Hence, propagation of electromagnetic noise by those parts can be prevented. In the present invention, the fixed electric potential can be a ground potential of the motor drive circuit and the source potential.

It is preferable that a capacitor with a capacitance of 0.1 micro fared or higher, is electrically connected to the motor source in parallel at a position close to the motor drive circuit according to the present invention. In this configuration, even when pulse current flows through the wiring of the motor source, ripples in the motor source can be absorbed by the capacitor. This ensures that the apparatus can function optimally.

According to the present invention, a mounting portion is a bearing holder which is made of a conductive resin and which holds a bearing, for example. In the case that a rotor comprises a pulley, electrostatic potential may be generated due to the movement of the pulley and a connecting belt. Since the bearing holder is formed of a conductive resin, the electrostatic potential built up in the rotor including the pulley can be removed. Also, even when the stator core is held at the ground electric potential, no negative effects are seen in the operation of the apparatus due to the fact that the bearing holder is made of a conductive resin. Even though the bearing holder is fixed to a chassis of a main body of the apparatus, the chassis will not be short-circuited with ground electric potential M-GND.

In the present invention, the mounting portion can be a metal bearing holder holding a bearing. In this case, it is preferable that insulators are placed between the bearing holder and the metal plate and between the bearing holder and the stator core.

In the above case, the bearing holder has a hole, into which a member with a screw hole, made of a conductive resin, is press-fitted. It is preferable that the bearing holder and the chassis of the main body are fixed with a screw screwed in the hole. In this configuration, the bearing holder is made of a metal, and [the motor] is connected with the chassis via the member with a screw hole made of a conductive resin. Therefore, even when a pulley is formed on the rotor, electrostatic potential pooled in the rotor can be removed.

BRIEF DESCRIPTION OF THE FIGURES

In FIG. 4, period (b) is when voltage is applied to the coil and period (c) is when application of voltage to the coil is suspended.

DESCRIPTION OF THE PREFERRED EMBODIMENTS

The following describes embodiments of the present invention in reference to drawings. In the embodiments described below, basic configurations are common to the one of a conventional motor. Therefore, identical symbols are used for those common parts.

Figure 1:
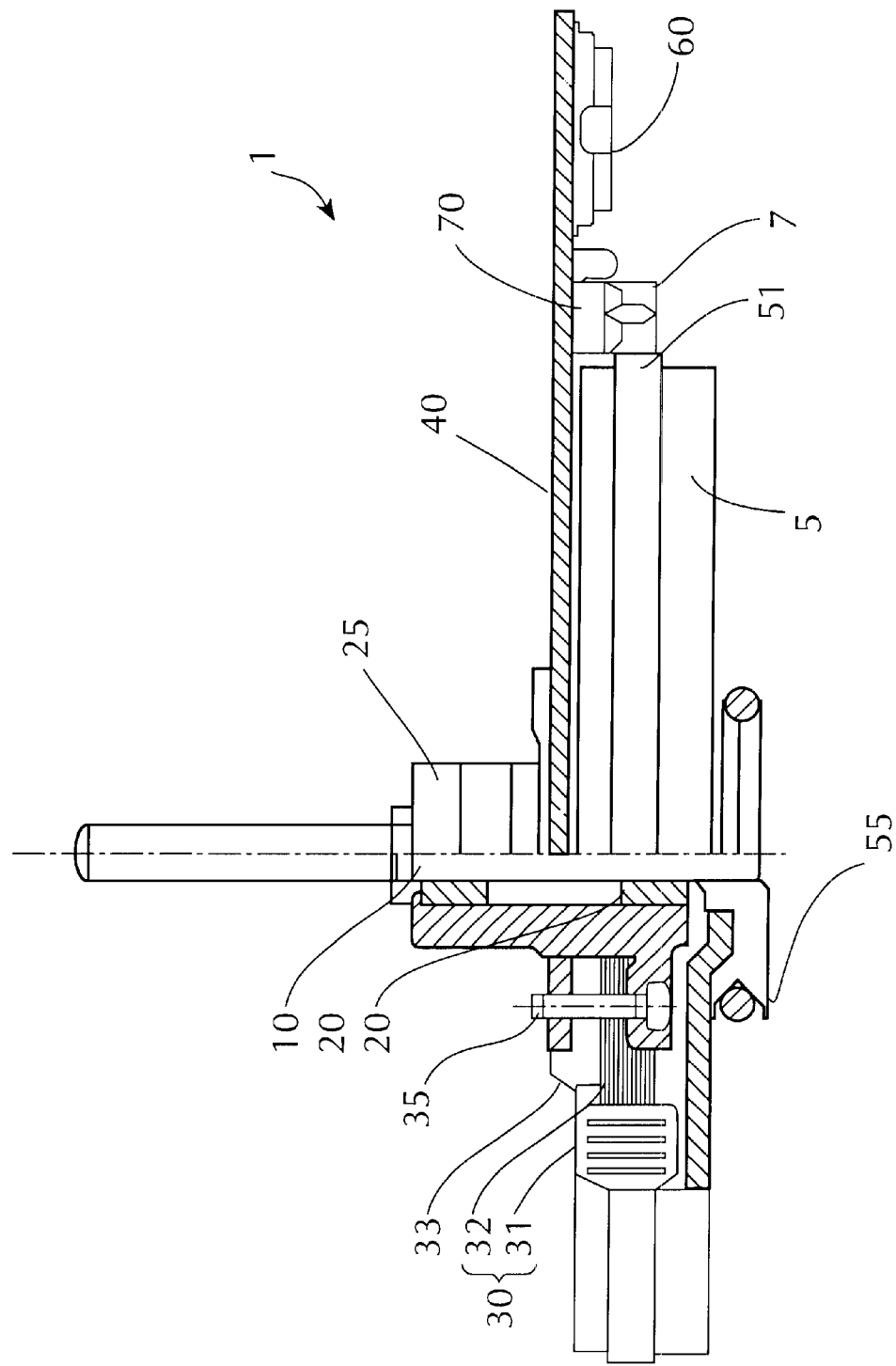
FIG. 1 is a side view with a partial longitudinal section of a brushless motor employing a direct PWM method according to the present invention.
Figure 2A:
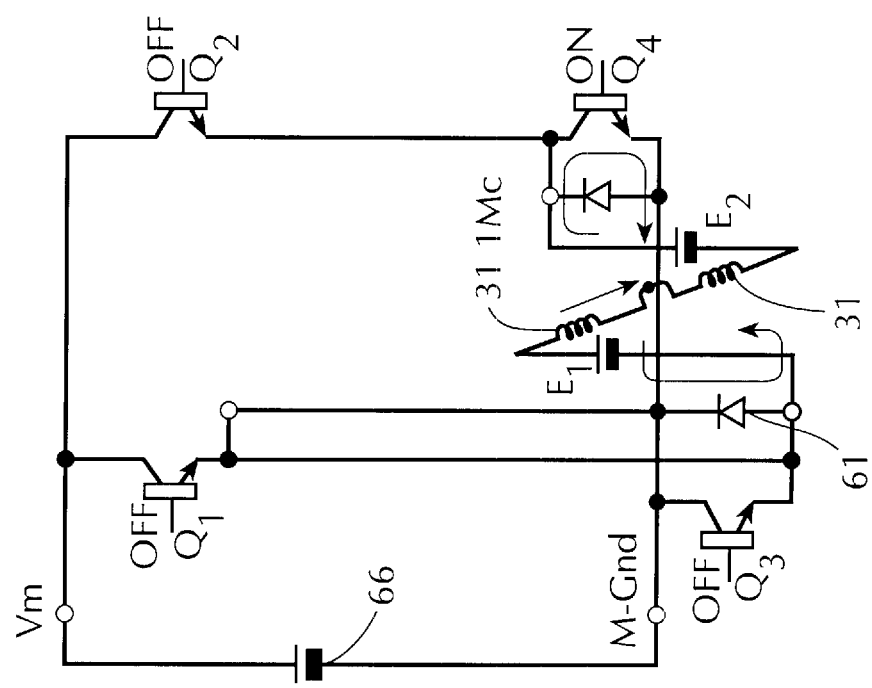
FIG. 2(A) shows a motor drive circuit of the brushless motor in FIG. 1 when electric power is supplied from a motor source to a coil.
Figure 2B:
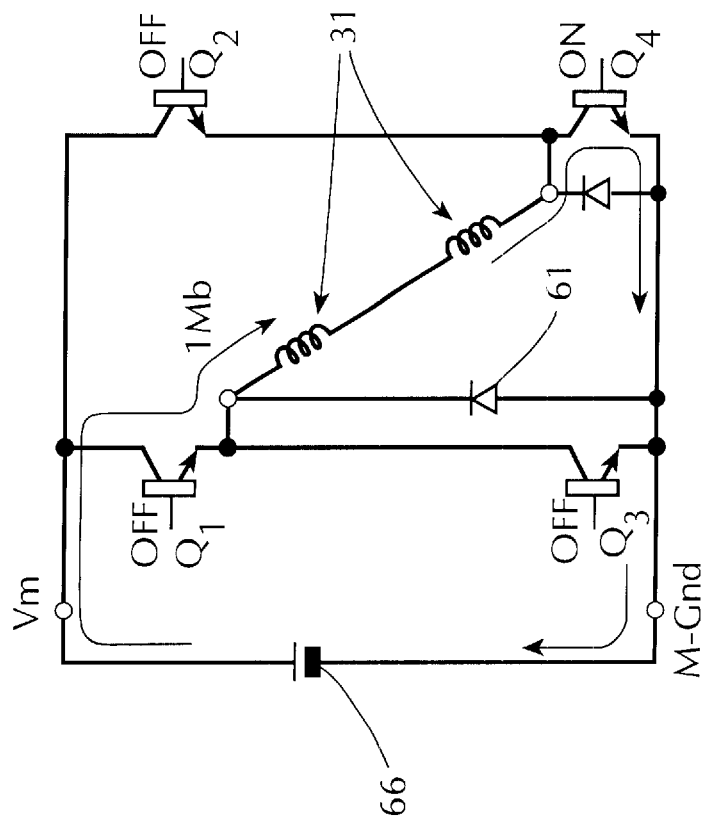
FIG. 2(B) shows the same when a regenerative current is caused due to counterelectromotive force generated in the coil as the supply of the electric power from the motor source to the drive coil is suspended.
Figure 3:
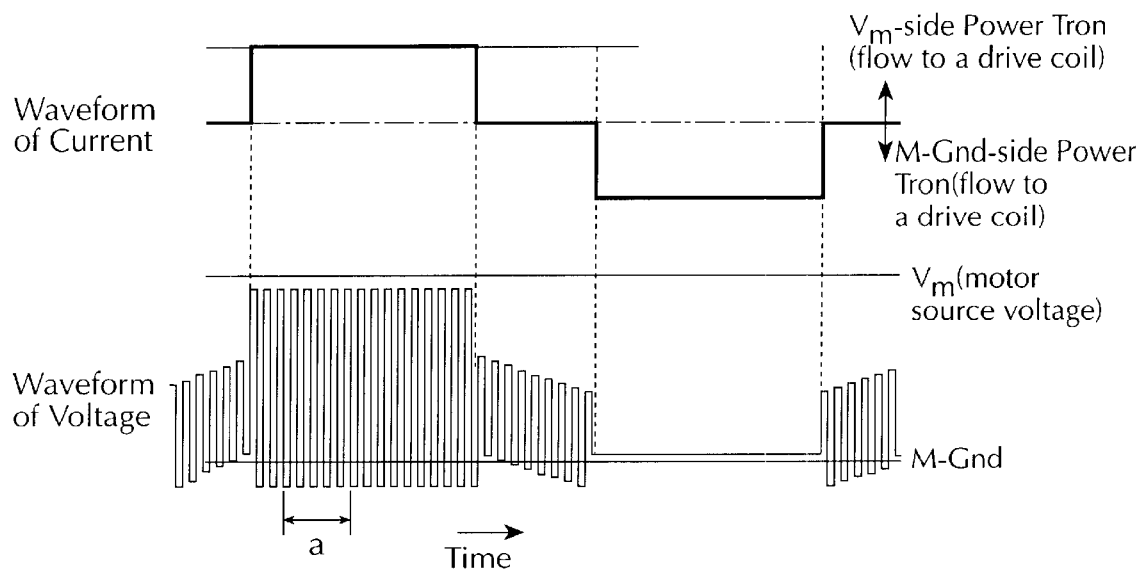
FIG. 3 illustrates waveforms of voltage and current applied to the coil during one phase when the control operations as described in FIGS. 2(A) and (B) are performed in the brushless motor in FIG. 1.
Figure 4:
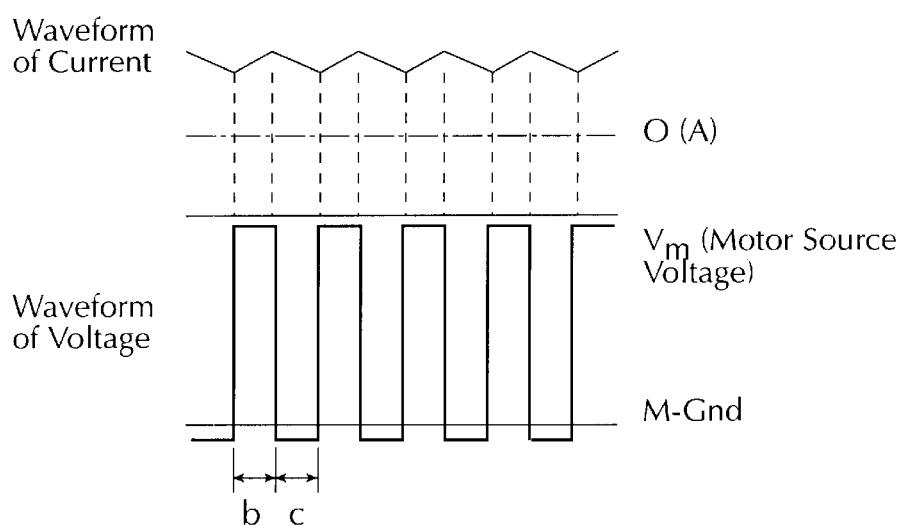
FIG. 4 shows waveforms of voltage and current for the periods within period (a) of FIG. 3.

FIG. 1 is a side view with a partial longitudinal section of a brushless motor according to the present invention.

As shown in FIG. 1, brushless motor 1 is comprised of: rotor 5 having pulley 55 which rotates together with rotational shaft 10, stator 30 having stator core 32 around which drive coil 31 is wound; iron substrate as a metal substrate and as a circuit substrate; motor drive circuit 60 having a circuit pattern and a drive IC and being placed on the bottom surface of iron substrate. Iron substrate 40 has a circuit pattern which connects motor drive circuit 60 and drive coil 31 wound around stator core 32.

Cylindrical bearing holder 25, mounted to iron substrate 40, has a mounting portion for fixing the motor to a chassis of the main body of the apparatus with a screw. Brushless motor 1 can be mounted to the apparatus by fixing the mounting portion of bearing holder 25 to the chassis of the apparatus with a screw.

Bearing holder 25 is formed of a conductive resin herein; however, it can be also formed of a metal as described in Embodiment 4, later. In the case of bearing holder 25 formed of a conductive resin, a given conductivity can be provided by mixing conductive carbon into engineering plastic.

Magnetic sensor 7 is placed on iron substrate 40 via sensor holder 70 such that FG outputs can be obtained from a magnetic pattern formed on outer circumference 51 of rotor 5.

A pair of bearings 20, such as sintered bearings, are held on top of each other inside bearing holder 25. Also, rotational shaft 10 passes through bearings 20. Stator core 32 is held on the outer surface of bearing holder 25 by using a step formed on the outer surface of bearing holder 25. Core 32 is covered by core holder 33 which is further covered by iron substrate. Iron substrate 40, core holder 33, and stator core 32 are fixed with screw 35. Drive coil 31 is wound around stator core 32, and a drive magnet (not shown in the figure) is mounted to the inner surface of rotor 5 facing the outer surface of stator core 32, forming a motor.

In brushless motor 1 having a configuration described above, a part of motor current is substituted by regenerative current by switching conditions of motor drive circuit 60 from that power transistor Q4 is on while power transistor Q1 is on to that power transistor Q4 is on while power transistor Q1 is off.

However, in brushless motor 1 employing the direct PWM method as described above, the voltage applied to coil 31 fluctuates between the voltage VM from the drive source and ground potential M-GND in a short period of time. Therefore, rapid fluctuation of the voltage applied to the wiring on iron substrate 40 and the voltage applied to coil 31 occurs such that electromagnetic noise tend to result. The configuration of the above embodiment prevents propagation of the electromagnetic noise.

Figure 5:
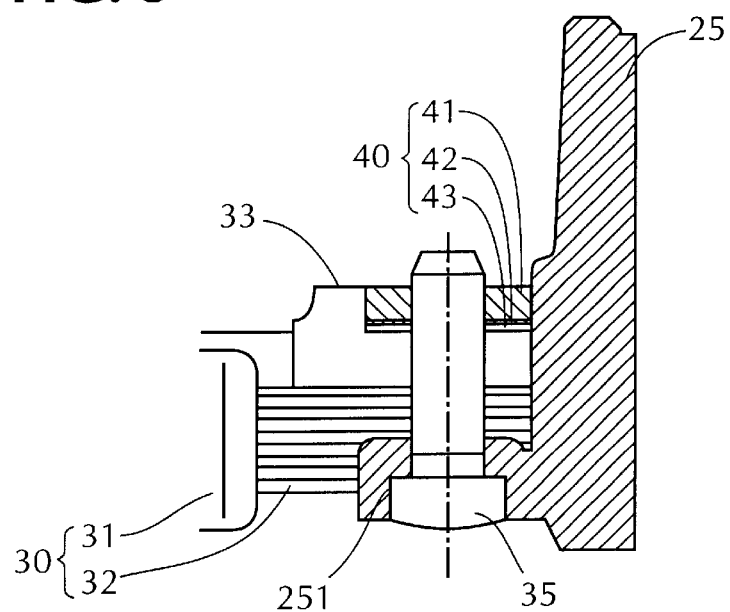
FIG. 5 is a cross section of a brushless motor employing the direct PWM method according to Embodiment 1 of the present invention indicating formation of a short circuit with an iron substrate and a core.

FIG. 5 is a cross section of a brushless motor employing the direct PWM method as described above in which an iron substrate and a stator core are short-circuited.

In FIG. 5, metal tap screw 35 provides a conductive metal connecting member which at flange portion 251 joins bearing holder 25, formed of a conductive resin, and iron substrate 40. The tap screw 35 fixes mechanically the flange portion 251, stator core 32, core holder 33 and iron substrate 40 together. The flange portion 251 and core holder 33 are insulators. Therefore, only the screw 35, stator core 32, and iron substrate 40 are connected electrically together, and the screw 35 is connected to the wiring pattern 43, then connected to the ground potential M-GND.

Herein, the upper surface of iron plate portion 41 of iron substrate 40, on which metal tap screw 35 is fixed, is exposed. Also, the lower surface of iron plate portion 41 has insulating layer 42. Wound wiring pattern 43, to which ground potential M-GND is applied, is formed at a position of insulating layer 42 where tap screw 35 is screwed. Since tap screw 35 has threads of a given size, iron plate portion 41 of iron substrate 40 is short-circuited to ground potential M-GND by connecting to wiring pattern 43 via tap screw 35. Additionally, stator core 32 is connected to wiring pattern 43 via tap screw 5 to be short-circuited to ground potential M-GND.

When brushless motor 1 is driven by the direct PWM method, rapid fluctuation is observed in the voltage applied to the wiring and the circuit pattern between motor drive circuit 60 and drive coil wound around stator core 32 and the voltage applied to coil. However, the potential of iron plate portion 41 as iron substrate 40, which forms a capacitive coupling with the wiring circuit pattern and coil 31 separately, or the potential of stator core 32 is short-circuited or fixed to ground potential M-GND via tap screw 35. Therefore, the above motor parts can prevent propagation of electromagnetic noise. In the above embodiment, tap screw 35 is used as a conductive connecting member which forms a short circuit between iron plate portion 41 or stator core 32 to ground potential M-GND. However, one is not limited to a screw for the connecting member; any member capable of forming an electric connection, can be adapted.

Also, the above embodiment has a configuration in which a ground wiring pattern of iron substrate 40 is positioned at a position on stator core 32 and iron plate portion 41 where a screw is placed such that stator core 32 and iron plate portion 41 are electrically connected to the ground wiring pattern. Also, bearing holder 25 is formed of a conductive resin. When bearing holder 25 is fixed to the chassis of the main body of the apparatus (not shown in the figure) via a mounting portion of bearing holder 25, stator core 32 or iron plate portion 41, that is the ground wiring, is insulated from the chassis by an insulating resistance higher than 1K ohm and lower than 100K ohm. Therefore, when the chassis functions as a ground for the entire apparatus, the chassis is not short-circuited to ground potential M-GND of the motor. As a result, the operation of the apparatus is not disturbed.

It is preferable that bearing holder 25 formed of a conductive resin has an insulating resistance of higher than 1K ohm and lower than 100K ohm to the chassis. However, an insulating resistance of 1M ohm or lower may not disturb the operation of the apparatus. Therefore, the range of the insulating resistance can be determined accordingly. It is suggested to determine such a range by considering whether electrostatic potential caused by rotation of pulley 55 with a belt can escape to the chassis via bearing holder 25 or whether the electrostatic potential of the motor may negatively affect the electronic parts of the motor. From these considerations, it is preferable to establish bearing holder 25 as an insulating resistance of 100K ohm or lower to the chassis.

To briefly, recapitulate, the pulse current generates the electromagnetic noise, which is propagated by means of the stator core 32 and the metal substrate 40. To prevent this undesirable result, the screw 35, stator core 32, and iron substrate 40 are connected electrically together, and the screw 35 is connected to the wiring pattern 43, then connected to the ground potential M-GND.

Second Embodiment

Figure 6:
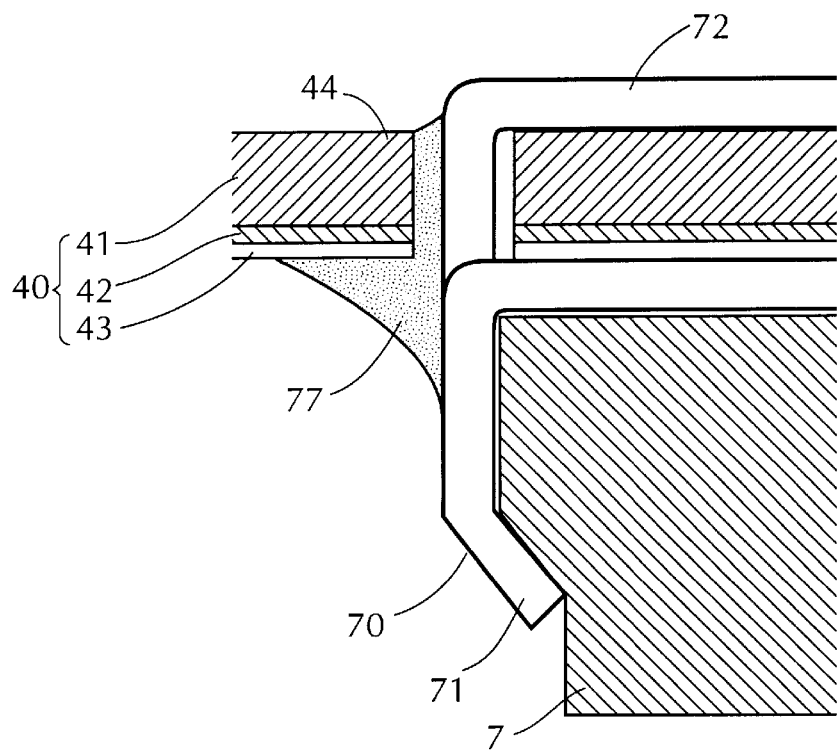
FIG. 6 is a cross section of a brushless motor employing the direct PWM method according to Embodiment 2, indicating formation of a short circuit with the iron substrate.

With iron substrate 40 as a metal substrate, iron plate portion 41 as a metal plate can be short-circuited to ground potential M-GND by using sensor holder 70 fixing magnetic sensor 7 to iron substrate 40 as a connecting member, as shown in FIG. 6.

FIG. 6 is a cross section of brushless motor 1 of this embodiment in which iron plate portion 41 of iron substrate 40 is short-circuited to ground potential M-GND by using sensor holder 70.

As shown in FIG. 6, sensor holder 70 is formed of a conductive metal plate, comprised of sensor holding portion 71, through hole 44 formed on iron substrate 40, and fixing hook 72 which is inserted into through hole 44. After passing through hole, fixing hook 72 is bent towards iron plate portion 41 at the opposite side of the substrate such that it contacts the exposed surface of iron plate portion 41. As a result, fixing hook 72 fixes sensor holder 70 onto iron substrate 40 by sandwiching iron substrate 40. Therefore, metal sensor holder 70 is in contact with wiring pattern 43 of iron substrate via solder 77 as well as iron plate portion 41.

Consequently, when brushless motor 1 is driven by the direct PWM method, iron plate portion 41 of iron substrate 40 is constantly held at ground potential M-GND via wiring pattern 43. Therefore, iron plate portion 41 does not propagate electromagnetic noise.

As shown in FIG. 6, solder 77 connects wiring pattern 43 and sensor holder 70. In addition, by placing solder 77 into through hole 44 of iron substrate 40 and bringing solder 77 in contact with iron plate portion 41, iron plate portion 41 can be further firmly fixed to ground potential M-GND.

Embodiment 3

Figure 7A:
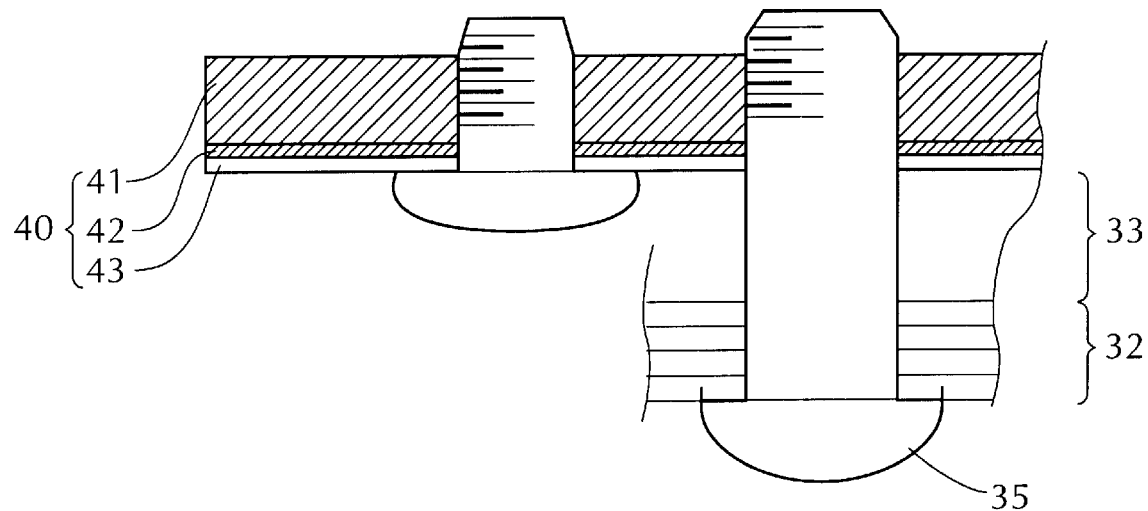
FIG. 7 is a cross section of a brushless motor employing the direct PWM method according to Embodiment 3, indicating formation of a short circuit with the iron substrate and the core.
Figure 7B:
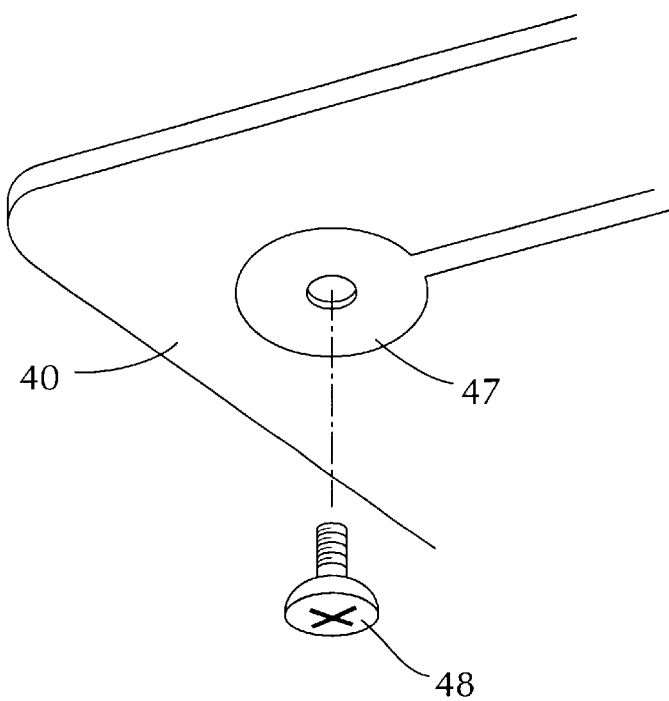

FIG. 7 (A), shows a further embodiment in which iron plate portion 41 of iron substrate 40 and stator core 32 are short-circuited to ground potential MGND. Herein, stator core 32, core holder 33 and iron substrate 40 are fixed all together with tap screw 35 as an example of a connecting member formed of a conductive metal. Further, as shown in FIG. 7 (B), landing portion 47 of ground potential M-GND is formed at the end of the circuit pattern on iron substrate 40. Then, iron plate portion 41 can be short-circuited to ground potential M-GND by placing metal screw 48 as another connecting member of a conductive metal in a hole formed at the center of landing portion 47.

In such a configuration, iron plate portion 41 of iron substrate 40 and stator core 32 can be short-circuited to ground potential M-GND via tap screw 35. Moreover, iron plate portion 41 of iron substrate 40 is short-circuited to ground potential M-GND by bringing [iron plate portion 41] in contact with landing portion 47 via screw 48 to further ensure the formation of the short circuit. Additionally, stator core 32 can be definitely short-circuited to ground potential M-GND.

A screw is used as a connecting member for forming a short-circuit in the above embodiment. However, a pin can be adapted as long as fixing and connection can be ensured.

Embodiment 4

The above embodiment was an example of a brushless motor employing bearing holder 25 formed of a conductive resin. The following describes an example using metal bearing holder 25 in reference to FIG. 8.

Figure 8:
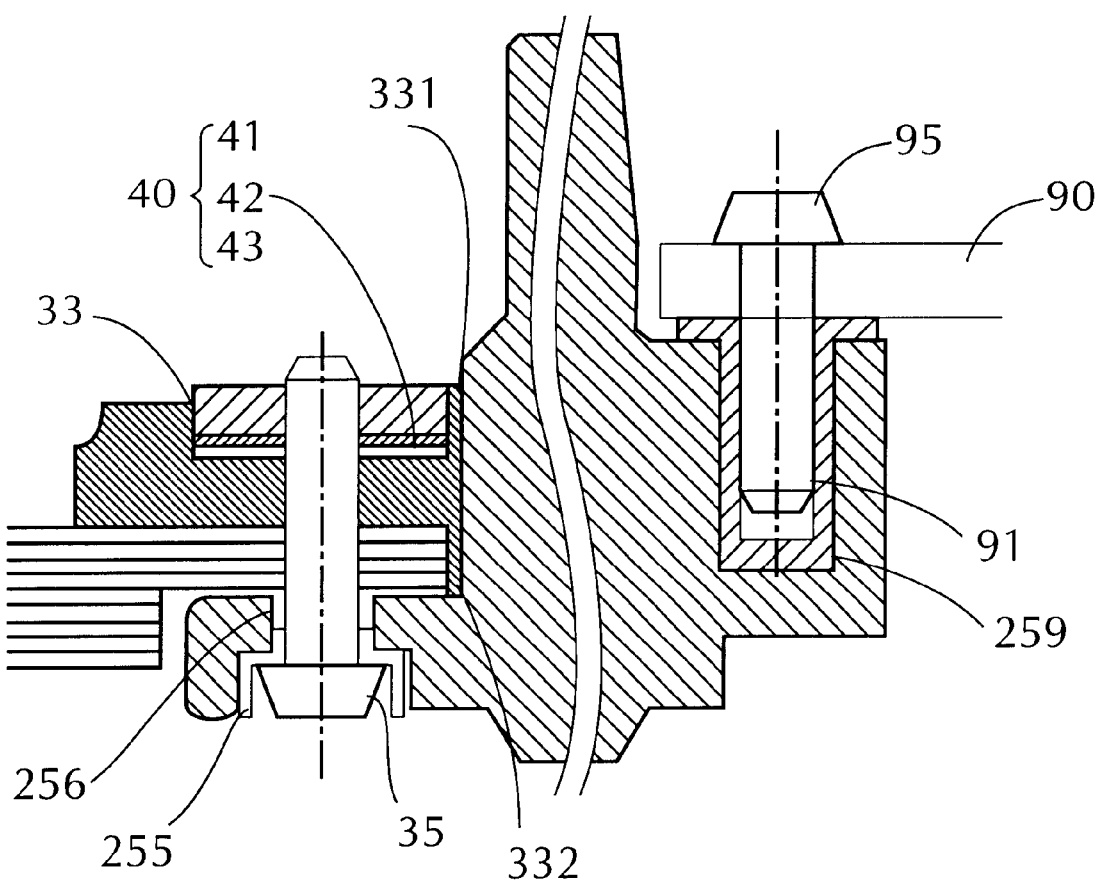
FIG. 8 is a cross section of a brushless motor employing the direct PWM method according to Embodiment 4, indicating formation of a short circuit with the iron substrate and core and a configuration of a bearing holder fixed to a chassis.

In FIG. 8, first cylinder 331 for insulation between iron substrate 40 and the outer surface of bearing holder 25 and cylinder 332 for insulation between the inner surface of stator core 32 and bearing holder 25 are used as core holder 33. Core holder 33 assures insulation in the two sections.

Also, iron plate portion 41 of iron substrate 40 and stator core 32 are short-circuited to ground potential M-GND wherein stator core 32, core holder 33 and iron substrate 40 are fixed together by metal tap screw 35. First insulating spacer 255 made of a resin is placed between bearing holder 25 and tap screw 35 while second insulating spacer 256 made of a resin is placed between bearing holder 25 and stator core 32. As a result, even when iron plate portion 41 and stator core 32 are short-circuited to ground potential M-GND, the areas between bearing holder 25 and iron plate portion 41 and between bearing holder 25 and stator core 32 maintain insulating resistance higher than 1K ohm. Therefore, when metal bearing holder 25 is directly fixed to chassis 90, insulating resistance higher than 1K ohm is ensured between chassis 90 and iron plate portion 41 of iron substrate 40 and between chassis 90 and stator core 32.

Further, cap 91 with a screw hole made of a conductive resin is adapted in this embodiment such that bearing holder 25 and chassis 90 are fixed with a given level of insulating resistance. In other words, bearing holder 25 has hold 259 in which cap 91 with a screw hole made of conductive resin is press-fitted. Fixing screw 95 to pierce chassis 90 is fitted in cap 91 with a screw hole in hole 259.

In this embodiment, bearing holder 25 has insulating resistance higher than 1K ohm in relation to chassis 90. Therefore, even though chassis 90 functions as a ground for the entire apparatus, chassis 90 does not form a short circuit with ground potential M-GND of the motor, guaranteeing the apparatus is not negatively affected.

Additionally, it is preferable that bearing holder 25 has insulating resistance lower than 100K ohm in relation to chassis 90, considering whether electrostatic potential causes negative effects on electronic parts of the motor. Accordingly, electrostatic potential caused by rotation of pulley 55 with a belt can escape to the chassis via bearing holder 25.

Figure 9A:
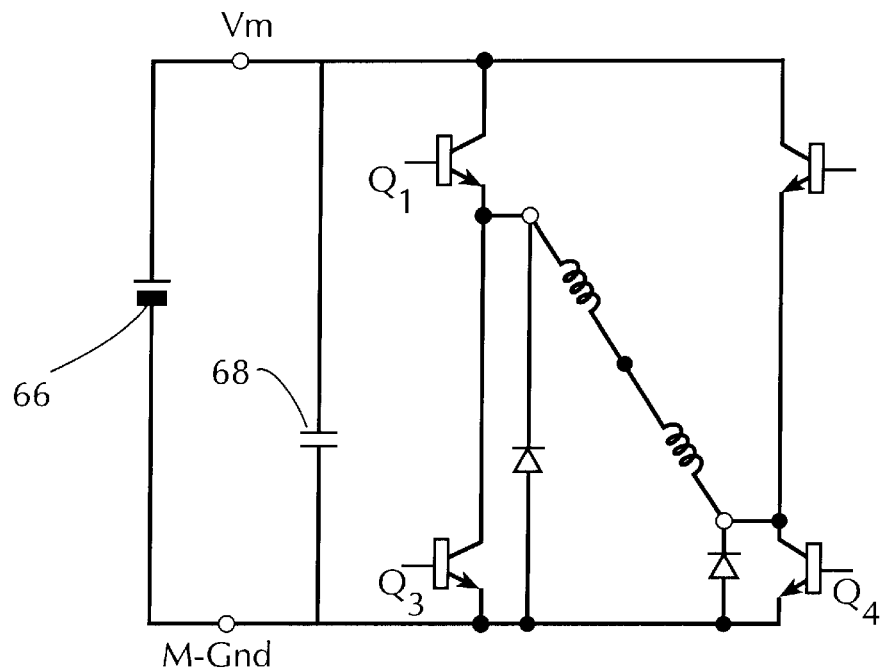
FIG. 9(A) is a circuit diagram of a motor drive circuit in the brushless motor according to Embodiment 5, indicating a configuration to prevent trouble cased by ripples which are generated when the motor is driven by the direct PWM method.
Figure 9B:
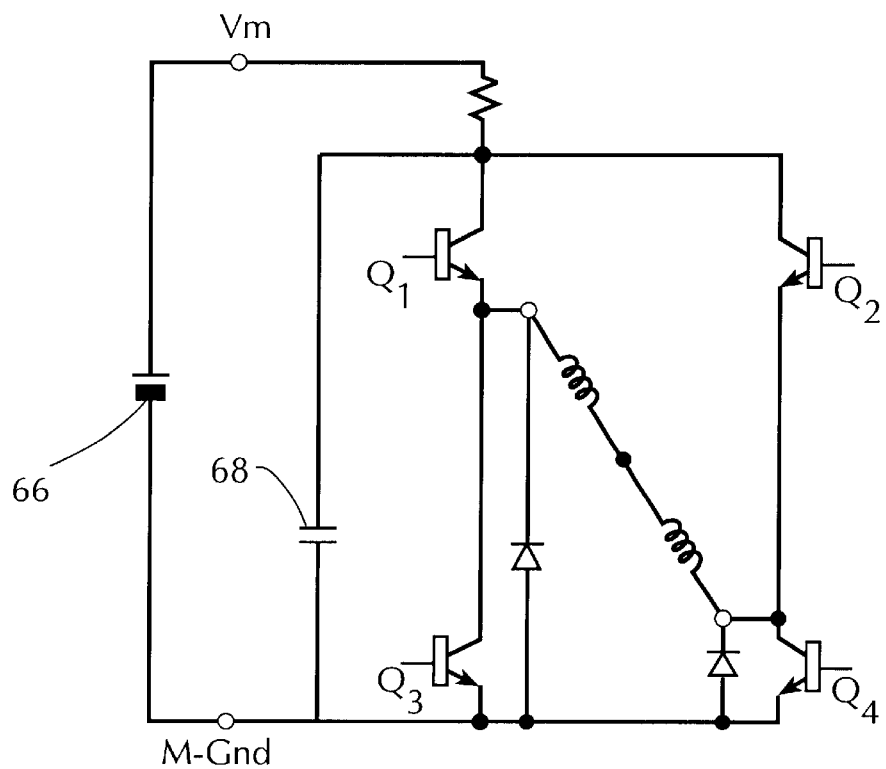
FIG. 9(B) is a modified diagram of the above circuit diagram showing a preferred embodiment incorporating a capacitor.

FIG. 9(A) is a circuit diagram of motor drive circuit 60 in brushless motor 1 according to the above embodiments 1 through 4 provide a configuration to prevent trouble cased by ripples which are generated when the motor is driven by the direct PWM method. FIG. 9(B) is a modified diagram of the above circuit diagram.

As shown in FIG. 9(A), capacitor 68 with a capacitance larger than 0.1ƒÊF is connected to motor source 66 in parallel with motor drive circuit 60 of brushless motor 1 according to this embodiment. Therefore, when ripples are generated in the wiring between motor source 66 and coil 31, these ripples escape to the wiring for ground potential M-GND via capacitor 68. As a result, since the ripples do not appear in motor source 66, the operation of the apparatus, such as a VCR, is not disturbed. In addition, the direct PWM method has a moment when all power transistors are turned off. In this case, regenerative current tends to return to motor source 66; however, capacitor 68 can absorb such a pulse. Hence, motor source 66 is protected [from the ripples] while motor drive circuit 60 is protected from voltage higher than its maximum voltage.

As shown FIG. 9(B), resistance RS for detecting motor current may be placed on the wiring between motor source 66 and coil 31 in motor drive circuit 60 of brushless motor 1. In this case, it is preferable to effectively remove ripples generated in motor drive circuit 60 by electrically connecting capacitor 68 for removing ripples, described in reference to FIG. 9(A), to motor source 66 in parallel at a position closer to motor drive circuit 60 than resistance RS for detecting motor current.

In the above embodiment, iron plate portion 41 and stator core 32 are fixed at ground potential M-GND. However, as long as it is a fixed potential, iron plate portion 41 and stator core 32 can be fixed at motor source voltage VM.

As described above, in a brushless motor employing the direct PWM method according to the present invention, the potential of a metal plate forming a metal substrate which forms a capacitive coupling with the two sections or a stator core is fixed. Therefore, even when rapid fluctuation in voltage applied to the wiring between a motor drive circuit and a coil and voltage applied to the coil occurs, propagation of electromagnetic noise is suppressed.

What is claimed is:

1. A brushless motor employing a direct PWM method which turns on and off a switching component of a motor drive circuit and which controls electric power to a drive coil of said motor by modulating the width of a switching pulse to said switching component, the brushless motor comprising:

a rotor which includes a rotatable shaft;

a stator which has a stator core with said drive coil wound therearound;

a metal substrate having a metal plate;

a motor drive circuit formed on said metal substrate;

a conductive connector, said metal plate and said stator core being electrically connected to each other by said conductive connector and further connected to a wiring pattern connected to a fixed electric potential such that both said metal plate and said stator core are connected to said fixed electric potential to prevent noise related to the direct PWM method; and a capacitor, which has a capacitance of at least 0.1 micro farad, electrically connected in parallel between said motor drive circuit and an electric power source for said motor to prevent noise related to the direct PWM method;

wherein an insulating resistance between a mounting portion of said motor to be connected to a chassis of a main body of an apparatus having said motor and said metal plate and an insulating resistance between said mounting portion and said stator core are both higher than 1K ohm and lower than 100K ohm to prevent noise related to the direct PWM method.

2. The brushless motor according to claim 1 in which said fixed electric potential is either a ground potential or a potential of an electric power source for said motor drive circuit.

3. The brushless motor according to claim 1 in which said mounting portion to be connected to the chassis of said main body is formed of a bearing holder made of a conductive resin to hold a bearing, which holds said rotational shaft and wherein said bearing holder has insulating resistance of higher than 1K ohm and lower than 100K ohm.

4. The brushless motor according to claim 1 in which said mounting portion to be connected to the chassis of said main body is formed using a conductive bearing holder holding said bearing, wherein insulating resistance between said bearing holder and said metal plate and between said bearing holder and said stator core are each between 1K ohm and 100K ohm.

5. The brushless motor according to claim 4 in which said bearing holder has a hole into which a member with a screw hole, made of a conductive resin, is fitted and wherein a screw, which fixes said bearing holder and said chassis of said main body, is screwed in said member with a screw hole.

6. A brushless motor employing a direct PWM method which turns on and off a switching component of a motor drive circuit and which controls an electric flow to a drive coil of said motor by modulating the width of a switching pulse to said switching component, the brushless motor comprising:

a rotor which rotates together with a rotational shaft to enable rotation supported by a bearing;

a stator which has a stator core with said drive coil wound therearound;

a metal substrate which forms a circuit substrate having a circuit pattern to provide electric power to said drive coil;

said motor drive circuit being formed on said metal substrate;

a first conductive metal member connecting at least one of a metal plate forming said metal substrate and said stator core to a fixed electric potential; and a capacitor, which has a capacitance of at least 0.1 micro farad, electrically connected in parallel between said motor drive circuit and an electric power source for said motor to prevent noise related to the direct PWM method; wherein said metal plate and said stator core are electrically connected to each other via said first conductive metal member;

a wiring pattern connected to said fixed electric potential is formed on said circuit substrate;

said metal plate is electrically connected to said wiring pattern such that said metal plate and said stator core are both connected to said wiring pattern to prevent noise related to the direct PWM method; and an insulating resistance between a mounting portion to be connected to a chassis of a main body of said motor and said metal plate and an insulating resistance between said mounting portion and said stator core are each between 1K ohm and 100K ohm to prevent noise related to the direct PWM method.

7. The brushless motor according to claim 6 in which said fixed potential is either a ground potential or a potential of an electric power source for said motor drive circuit.

8. The brushless motor according to claim 7 in which:

a first conductive metal couples said metal plate and said stator core to a common potential.

9. In a brushless electric motor which is driven by pulse width modulated input power from a motor drive circuit, which circuit is mounted on a conductive metal substrate and which motor has a stator with a drive coil wound around a stator core, the improvement comprising:

an electric conductor connected to: (a) a ground of the motor drive circuit, (b) the stator core and (c) the conductive substrate on which the motor drive circuit is mounted to provide a common potential for all three connections to prevent noise related to the direct PWM method, a ripple absorbing capacitor connected in parallel with the motor drive circuit and an electrical power source for the motor to prevent noise related to the direct PWM method, the ripple absorbing capacitor operable to absorb ripples generated by the brushless motor employing the direct PWM method, wherein an insulating resistance between a mounting portion of said motor to be connected to a chassis of a main body of an apparatus having said motor and said conductive substrate, and an insulating resistance between said mounting portion and said stator core are both higher than 1K ohm and lower than 100K ohm to prevent noise related to the direct PWM method, whereby there is substantial suppression of noise which is generated for the pulse width modulated electric power input to the motor.

10. The improvement of claim 9 wherein: said electric conductor is a screw fastened through the stator core and conductive substrate.

11. The improvement of claim 10 further comprising: a capacitor connected across the motor drive circuit.

12. The improvement of claim 9 further comprising: a capacitor connected across the motor drive circuit.

13. A brushless motor employing a direct PWM method which turns on and off a switching component of a motor drive circuit and which controls electric power to a drive coil of the motor by modulating the width of a switching pulse to the switching component, the brushless motor comprising:

a rotor which includes a rotatable shaft;

a stator which has a stator core with the drive coil wound therearound;

a metal substrate having a metal plate;

a motor drive circuit disposed on the metal substrate;

a ripple absorbing capacitor connected in parallel with the motor drive circuit and an electrical power source for the motor, the ripple absorbing capacitor operable to absorb ripples generated by the brushless motor employing the direct PWM method; and a conductive connector connecting the metal plate and said stator core to a fixed electric potential;

wherein an insulating resistance between a mounting portion of the motor to be connected to a chassis of a main body of an apparatus having said motor and the metal plate and the insulating resistance between the mounting portion and the stator core are both higher than 1K ohm and lower than 100K ohm.

* * * * *